United States Patent
Wang et al.

(10) Patent No.: US 11,983,224 B2
(45) Date of Patent: May 14, 2024

(54) DATA PRESENTATION SYSTEM, METHOD AND DEVICE, AND COMPUTER-READABLE STORAGE MEDIUM

(71) Applicant: CHANGXIN MEMORY TECHNOLOGIES, INC., Anhui (CN)

(72) Inventors: Chunyang Wang, Hefei (CN); Huan Wu, Hefei (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 395 days.

(21) Appl. No.: 17/393,455

(22) Filed: Aug. 4, 2021

(65) Prior Publication Data
US 2021/0365496 A1    Nov. 25, 2021

Related U.S. Application Data

(63) Continuation of application No. PCT/CN2021/092953, filed on May 11, 2021.

(30) Foreign Application Priority Data

May 19, 2020   (CN) .......................... 202010426323.2

(51) Int. Cl.
G06F 21/62    (2013.01)
G06F 16/25    (2019.01)
G06F 16/904   (2019.01)

(52) U.S. Cl.
CPC .......... G06F 16/904 (2019.01); G06F 16/254 (2019.01); G06F 21/6218 (2013.01)

(58) Field of Classification Search
CPC ...... G06F 16/904; G06F 16/254; G06F 21/60; G06F 21/606; G06F 21/62; G06F 21/6218
See application file for complete search history.

(56) References Cited

U.S. PATENT DOCUMENTS 7,813,822 B1 *  10/2010  Hoffberg ................ H04N 7/163
                                                          381/73.1
9,594,914 B2 *   3/2017  Kesavan ................. G06F 21/60
(Continued)

FOREIGN PATENT DOCUMENTS

CN    104200402 A    12/2014
CN    104504094 A     4/2015
(Continued)

OTHER PUBLICATIONS

Second Office Action of the Chinese application No. 202010426323. 2, issued on Mar. 2, 2024, 14 pages with English translation.

*Primary Examiner* — Hosuk Song
(74) *Attorney, Agent, or Firm* — Cooper Legal Group, LLC (57) ABSTRACT

Provided are a data presentation system, method and device, and a computer-readable storage medium. The data presentation system includes: a data collection device configured to collect multiple service system data each from a respective data source and store the service system data in a database; a data parsing device configured to obtain the multiple service system data from the database, and parse each service system data through a respective data model to obtain a data block corresponding to the respective data source; a request responding device configured to: in response to a data request sent by a client, obtain the data block matching the data request as a demanded data block; and a data sending device configured to send the demanded data block to the client to enable a display interface of the client to display the demanded data block.

17 Claims, 5 Drawing Sheets

(56) References Cited

U.S. PATENT DOCUMENTS

| | | | | |
|---|---|---|---|---|
| 9,892,383 B2* | 2/2018 | Pujari | ............... | G06Q 20/027 |
| 9,967,351 B2* | 5/2018 | Maheshwari | ......... | G06F 3/0484 |
| 10,193,775 B2* | 1/2019 | Fletcher | ............. | H04L 41/5009 |
| 10,305,758 B1* | 5/2019 | Bhide | ................. | G06F 11/3409 |
| 10,319,173 B2* | 6/2019 | Adelberg | ............... | G07F 11/62 |
| 2017/0026450 A1 | 1/2017 | Yao | | |
| 2020/0349641 A1* | 11/2020 | Fidanza | ................ | G06N 20/00 |

FOREIGN PATENT DOCUMENTS

| | | | |
|---|---|---|---|
| CN | 106250444 A | 12/2016 | |
| CN | 108762738 A | 11/2018 | |
| CN | 109033387 A | 12/2018 | |
| CN | 111159180 A | 5/2020 | |
| CN | 112434023 A | 3/2021 | |

\* cited by examiner

DATA PRESENTATION SYSTEM, METHOD AND DEVICE, AND COMPUTER-READABLE STORAGE MEDIUM

CROSS-REFERENCE TO RELATED APPLICATIONS

The present application is a continuation of International Application No. PCT/CN2021/092953, filed on May 11, 2021, which claims priority to Chinese Patent Application No. 202010426323.2, filed on May 19, 2020 and entitled "Data Presentation System, Method and Device, and Computer-Readable Storage Medium". The contents of International Application No. PCT/CN2021/092953 and Chinese Patent Application No. 202010426323.2 are incorporated herein by reference in their entireties.

BACKGROUND

At present, taking a semiconductor manufacturing process as an example, a data acquisition system acquires all kinds of service data in real time. By analyzing the acquired service data, an operator can not only monitor and analyze the operating conditions of a production factory, but also can analyze the conditions of a specific machine table or manufacturing process. However, the existing service data are often stored in different databases, and a user needs to spend a lot of time to look for all kinds of service data when desired to grasp and analyze the operating conditions of the factory and other conditions, which will consume a lot of time and decrease the work efficiency. In addition, each time of browsing the service data, all databases storing service data need to be traversed, which is time-consuming and occupies many system resources.

SUMMARY

Embodiments of the disclosure relate to the technical field of data acquisition, and in particular to a data presentation system, method and device, and a computer-readable storage medium.

A data presentation system is provided, including: a data collection device, a data parsing device, a request responding device, and a data sending device, wherein: the data collection device is configured to: collect multiple pieces of service system data each from a respective data source, and store the service system data in a database; the data parsing device is configured to: obtain the multiple pieces of service system data from the database, and parse each piece of service system data through a respective data model to obtain a data block corresponding to the respective data source; the request responding device is configured to: in response to a data request sent by a client, obtain, from the data parsing device, a data block matching the data request as a demanded data block, and send the demanded data block to the data sending device; and the data sending device is configured to send the demanded data block to the client, to enable a display interface of the client to display the demanded data block.

The embodiments of the disclosure also provide a data presentation method, including: in response to a data request of a client, acquiring, from a database, multiple pieces of service system data matching the data request, wherein each of the multiple service system data is collected from a respective data source; parsing each of the multiple pieces of service system data through a respective data model, so as to obtain demanded data blocks each corresponding to a respective data source; and sending the demanded data blocks to the client, to enable a display interface of the client to display the demanded data blocks.

The embodiments of the disclosure also provide a data presentation device, including: at least one processor, and a memory in communication connection with the at least one processor. The memory stores instructions executable by the at least one processor, and the instructions, when executed by the at least one processor, enable the at least one processor to perform the above data presentation method.

The embodiments of the disclosure also provide a computer-readable storage medium having stored thereon a computer program that, when executed by a processor, implements the above data presentation method.

BRIEF DESCRIPTION OF THE DRAWINGS

One or more embodiments are described exemplarily through the pictures in the corresponding accompanying drawings. These exemplary descriptions do not form a limit to the embodiments. Elements with the same reference numeric label in the accompanying drawings are represented as similar elements. The drawings in the accompanying drawings do not form a proportion limit unless otherwise stated.

DETAILED DESCRIPTION

In order to make the purpose, technical solutions and advantages of the embodiments of the disclosure clearer, the embodiments of the disclosure will be described in detail below in combination with the accompanying drawings. However, those of ordinary skill in the art may understand that many technical details are presented in the embodiments of the disclosure to make the disclosure better understood by the reader. However, the technical solution claimed in the disclosure may still be implemented even without these technical details, or changes and modifications based on the following embodiments.

The purpose of the disclosure is to provide a data presentation system, method and device, and a computer-readable storage medium, which can save system resources while improving the work efficiency.

Figure 1:
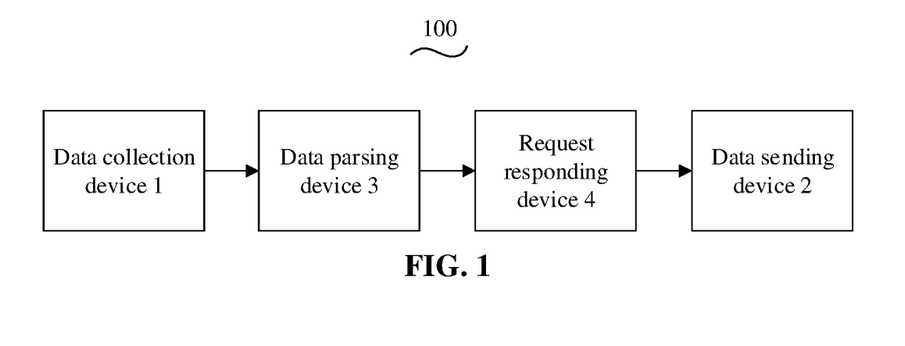
FIG. 1 illustrates a schematic structural diagram of a data presentation system provided in an embodiment of the disclosure.

An embodiment of the disclosure relates to a data presentation system, the particular structure of which is illustrated in FIG. 1, and includes: a data collection device 1, a data sending device 2, a data parsing device 3 and a request responding device 4.

The data collection device 1 is configured to collect multiple pieces of service system data each from a respective data source, and store the service system data in a database. The data parsing device 3 is configured to: obtain the multiple pieces of service system data from the database, and parse each piece of service system data through a respective data model to obtain a data block corresponding to the respective data source. The request responding device 4 is configured to: in response to a data request sent by a client, obtain, from the data parsing device 3, a data block matching the data request as a demanded data block, and send the demanded data block to the data sending device 2. The data sending device 2 is configured to send the demanded data block to the client, to enable a display interface of the client to display the demanded data block.

The service system data include, but are not limited to, multiple types of data in the following: production management data, quality management data, measurement data, abnormal product data, recipe data, engineering analysis data, machine table state data and product test data. For example, the measurement data includes statistical process control (SPC) data (including the measurement data and Fault Detection Control (FDC) data); the production management data includes Throughput data (including Work In Progress (WIP) data); the abnormal product data includes Hold Lot data (including abnormal product data of production line); the machine table state data includes Tools data (including station passing data, which includes Recipe Management System (RMS) information and FDC information); the engineering analysis data includes Experiment (including Engineering Data Analysis (EDA) data and Process Change Review Board (PCRB) data); the recipe data includes RMS data; the abnormal product data includes Abnormal Lot data (including Process Abnormal Notice LOT (PANLot) data and disposal data); the product test data includes Mismatch data (including process column data, for example, Wafer Acceptance Test (WAT) data and wafer-level Chip Probing (CP) data); and the quality management data includes SM data and iCapa data.

Compared with the related art, in the embodiments of the disclosure, by providing the data collection device 1, multiple pieces of service system data stored by various data sources can be collected, so that the service system data that the user need to view are no longer distributed and stored in different data sources, but uniformly stored in the database. Thus, when needing to view data, instead of looking for the service system data to be viewed in each data source, the user only needs to look for the data in the database, which improves the working efficiency of the system. Moreover, each piece of service system data can be converted into multiple data blocks by the data parsing device 3, so that each data block can run independently. That is, each data block can be dynamically split and operated, thereby improving the operating rate of the system and saving the system resources. After receiving the data request of the client, the request responding device 4 selects the data block matching the data request from multiple data blocks as the demanded data block, and sends the demanded data block to the data sending device 2. Then the data sending device 2 sends the demanded data block to the client. In this way, corresponding data blocks can be provided for different customers, thus improving the customers' use experience, and further improving the working efficiency of the system.

Figure 2:
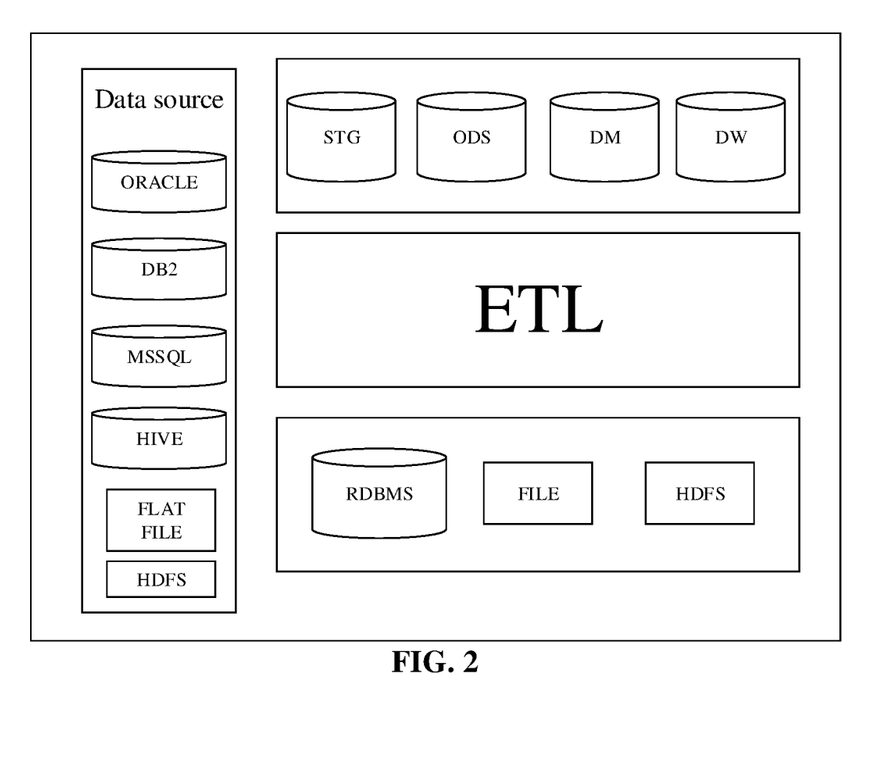
FIG. 2 illustrates an architecture diagram of a data presentation system provided in an embodiment of the disclosure.

With reference to FIG. 2, it is worth mentioning that the data collection device 1 in the present embodiment is an independently developed automatic collection system. The system uses the Extract-Transform-Load (ETL) technique, that is, the data of the service system is extracted, converted and then loaded into a data warehouse. The data collection device 1 may also customize rules, such as when to update the service system data, and when to extract the service system data from various data sources. In addition, the data collection device 1 in the present embodiment may also have many functions, such as supporting tool expansion, dynamic load balance of work, disaster recovery of scheduling server cluster, and expansion of working time control precision (from day to minute), which will not be described here. The data sources may be many types of database platforms, including but not limited to one or more of: ORACLE, DB2, MSSQL, HIVE, FLAT FILE, and hadoop distributed file system (HDFS). Data layers may include a stage (STG) layer, an operational data store (ODS) layer, a data mart (DM) layer and a data warehouse (DW) layer in sequence. The data may be output through a variety of database platforms, including but not limited to one or more of relational database management system (RDBMS), filecoin (FIL) and HDFS.

Figure 3:
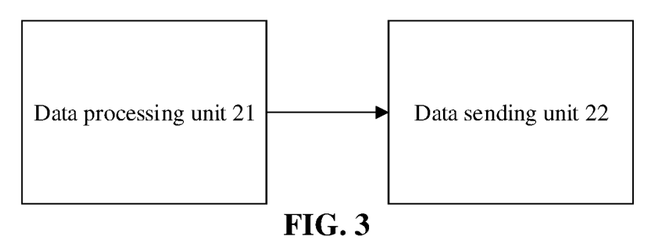
FIG. 3 illustrates a schematic structural diagram of a data sending device provided in an embodiment of the disclosure.

As illustrated in FIG. 3, the data sending device 2 includes a data processing unit 21 and a data sending unit 22. When there are multiple demanded data blocks, the request responding device 4 is further configured to send the multiple demanded data blocks to the data processing unit 21. The data processing unit 21 is configured to assemble the multiple demanded data blocks into a data report view, and transmit the data report view to the data sending unit 22. The data sending unit 22 is configured to send the data report view to the client, to enable the display interface of the client to display the data report view. That is, the data presentation system 100 in the present embodiment may accept multiple data requests from the same client (for example, a user wants to view multiple data reports at the same time) or multiple data requests from respective different clients (for example, multiple users want to view data reports at the same time). By converting the demanded data blocks into the data report view before sending the demanded data blocks to the client, the display interface of the client can display the data in multiple demanded data blocks, thereby making the service system data more intuitive and improving the user experience.

Specifically, in the present embodiment, the demanded data blocks may be converted into the data report view through the same data processing unit 21 (such as an interface design module). In this way, the style of the entire interface can be maintained uniform, and the basic functions can be multiplexed, avoiding waste of resources and alleviating the load of the browser. There is no need to rewrite service logics while improving and customizing the interface and the interaction with the user. The demanded data block can also be converted into the data report through different interface design modules, so that the interface styles of the data report are diversified and the user experience is improved.

It is worth mentioning that, in the present embodiment, after receiving the data request sent by the client, the request responding device 4 may also split the data request into multiple data sub-requests, and obtain the multiple demanded data blocks each matching a respective one of the data sub-requests from the data parsing device 3. That is, the report requested by the user at the client can be dynamically split into multiple request threads for the request responding device 4. Distributed request and response may be performed between the request responding device 4 and the database, thereby improving the working efficiency of the request responding device 4.

Preferably, the demanded data block includes a data report and security state information, and each data model includes a data unit and a security state unit. The data parsing device 3 is further configured to parse each piece of service system data through a data unit of the respective data model to obtain data information, and fill a preset report template with the data information obtained by parsing, to obtain a data report corresponding to the respective data source. The data parsing device 3 is further configured to compare each piece of service system data with a respective data threshold through a security state unit of the respective data model, to obtain security state information of the respective data source. The data sending device is configured to send the demanded data block to the client, to enable the display interface of the client to display the data report of the demanded data block and a security state of the data report of the demanded data block. In this way, the user can more intuitively understand the data report according to the security state of the data report, thereby further improving the user experience.

More preferably, the data parsing device 3 is further configured to modify a display parameter of the demanded data block according to security state information in the demanded data block. The data sending unit 22 is configured to send the demanded data block to the client, to enable the display interface of the client to display the demanded data block according to the display parameter. It is understandable that the display parameter in the present embodiment may be the color of the demanded data block, that is, the security states of the demanded data block are represented by different colors. The display parameter may also be the shape of the demanded data block, etc. The type of display parameter is not specifically limited in the embodiment.

For the convenience of understanding, how to display data reports and security state of the data reports on the display interface of the client in the present embodiment is illustrated in detail below.

If the user wants to view three reports A\B\C, then the user may send the data request, which includes information of the three reports A\B\C that the user wants to view, to the request responding device 4 through the client. After receiving the data request, the request responding device 4 sends three data blocks corresponding to the three reports A\B\C to the data sending device 2 (the data parsing device 3 parses each piece of service system data through a respective data model, to obtain a data block corresponding to a respective data source. Because each data model includes a data unit and a security state unit, the data parsing device may parse each piece of service system data through the data unit of the respective data model, to obtain a data report corresponding to the respective data source. The data parsing device may also compare each piece of service system data with a corresponding data threshold through the security state unit of the respective data model, to obtain the security state information of the respective data source). The data processing unit 21 of the data sending device 2 converts the three data blocks into one data report view, and finally sends the data report view to the client through the data sending unit 22, so that the display interface of the client displays the data reports and the security states of the data reports. It is worth mentioning that in the present embodiment, the security state of the data report can be displayed by providing a color bar on the upper part of the data report. For example, a red color bar represents that the data of the data report is abnormal, and a green color bar represents that the data of the data report is normal.

It is worth mentioning that the demanded data block in the present embodiment includes a permission level, and the request responding device 4 is further configured to: obtain role information carried by the data request, obtain the permission level from the demanded data block, and send the demanded data block to the data sending device 2 in response to that the role information matches the permission level.

Figure 4:
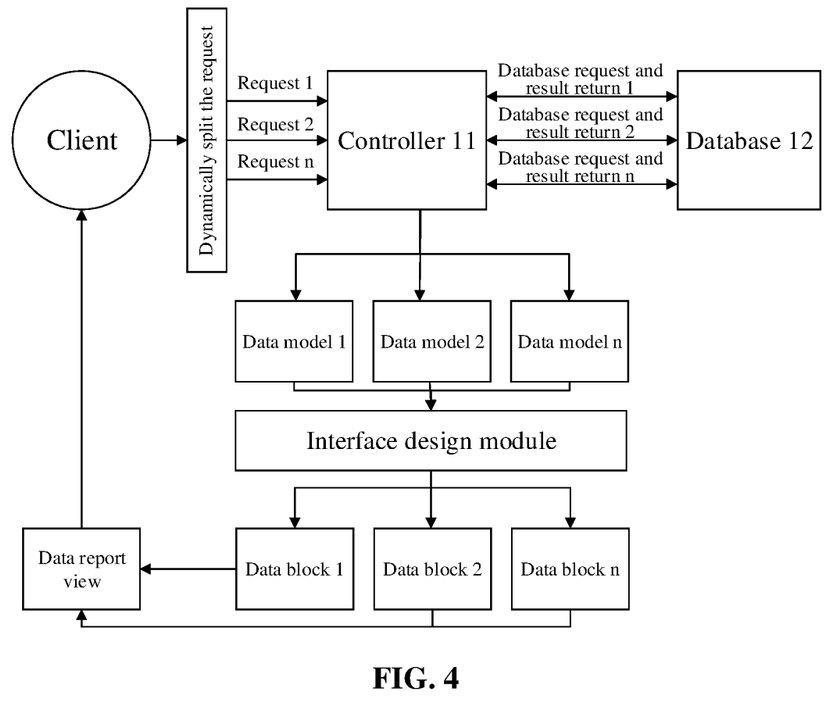
FIG. 4 illustrates an operating principle diagram of a data presentation system provided in an embodiment of the disclosure.

As illustrated in FIG. 4, the data collection device 1 in the present embodiment includes a controller 11 and a database 12. The database 12 is configured to store the data blocks. The controller 11 is configured to receive the data request, and send the demanded data block to the data sending device 2. In this way, the devices of the data presentation system can cooperate with each other and run more orderly.

For the convenience of understanding, the working process of the data presentation system 100 in the present embodiment is described below based on the model-view-controller 5 (MVCS) infrastructure architecture with an example that a user wants to view multiple data reports at the same time as an example, as illustrated in FIG. 4.

The data request sent by the user is dynamically split into request 1 to request n (each request represents a data report that the user wants to view). After receiving the n requests, the controller 11 obtains, from the database, n piece of service system data corresponding to the n requests. The controller 11 parses the n pieces of service system data using corresponding data models according to preset service logics, and then processes the parsed information through the same interface design module to obtain n data blocks with basically the same basic style. The data block may be in form of a data report. Finally, n data blocks are assembled into one data report view and displayed on the display interface of a display device.

It is worth mentioning that the MVCS architecture is easy in operation and maintenance, and is easily extensible, and front-end and back-end service resources may be allocated evenly. A three-tier architecture, a model-view-view-model (MVVM) architecture, and so on may also be used. The type of the architecture is not specified in the embodiment.

Figure 5:
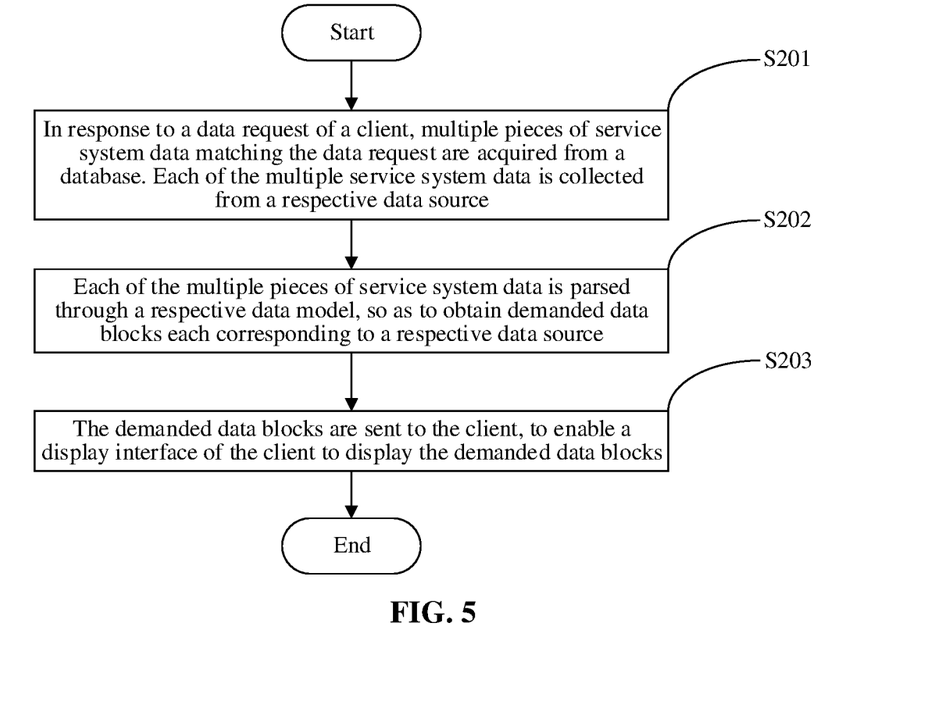
FIG. 5 illustrates a flowchart of a data presentation method provided in an embodiment of the disclosure.

An embodiment of the disclosure relates to a data presentation method. The specific procedure of the present embodiment is as illustrated in FIG. 5, and includes the following operations.

At S201, in response to a data request of a client, multiple pieces of service system data matching the data request are acquired from a database. Each of the multiple service system data is collected from a respective data source.

Specifically, the database in the present embodiment is an independently developed automatic collection system. The system uses the Extract-Transform-Load (ETL), that is, the data of the service system is extracted, converted and then loaded into the database. The database may also customize rules, such as when to update the service system data, and when to extract the service system data from various data sources. In addition, the database in the present embodiment may also have many functions, such as supporting tool expansion, dynamic load balance of work, disaster recovery of scheduling server cluster, and expansion of working time control precision (from day to minute), which will not be described here.

At S202, each of the multiple pieces of service system data is parsed through a respective data model, so as to obtain demanded data blocks each corresponding to a respective data source.

Specifically, the way of parsing each of the multiple pieces of service system data in the present embodiment may be that: each of the multiple pieces of service system data is parsed to obtain data information, and a preset report template is filled with the data information obtained by parsing, to obtain a data report corresponding to the respective data source.

It is worth mentioning that in the present embodiment, each of the multiple pieces of service system data may be compared with a respective data threshold to obtain security state information of the respective data source. After the security state information is obtained, a display parameter of each demanded data block may be modified according to security state information in the demanded data block. In this way, the user can more intuitively understand the security state of the data report according to the display parameter, which further improves the user experience.

At S203, the demanded data blocks are sent to the client, to enable a display interface of the client to display the demanded data blocks.

Specifically, in order to enable the user to browse the service system data more intuitively, before a demanded data block is displayed on the display interface of the client, the demanded data block may also be converted into a data report in the present embodiment. Then the data report is sent to the client so that the display interface of the client displays the data report. It is understandable that if the demanded data block in the above action includes a display parameter, the display interface of the client will display the demanded data block according to the corresponding display parameter.

It is worth mentioning that a presentation form of the data report is not specifically limited in the embodiment, and the data report may be: "inflator", "thermometer chart", "histogram", "Pareto Diagram" and so on. The system may choose different presentation forms according to the types of the service system data, so that the user can understand the service system data more intuitively.

Preferably, the user may also send report-reviewing demands to the system via the client. The specific demands include the size of the data report, the presentation form of the data report, the color of the data report, and so on. That is, for different user demands, and the report each user needs to view may be presented through customization.

Compared with the related art, in the embodiments of the disclosure, by providing the data collection device, multiple pieces of service system data stored by various data sources can be collected, so that the service system data that the user need to view are no longer distributed and stored in different data sources, but uniformly stored in the database. Thus when needing to view data, instead of looking for the service system data to be viewed in each data source, the user only needs to look for the data in the database, which improves the working efficiency of the system. Moreover, each of the service system data can be converted into multiple data blocks by the data parsing device, so that each data block can run independently. That is, each data block can be dynamically split and operated, thereby improving the operating rate of the system and saving the system resources. After receiving the data request of the client, the request responding device selects the data block matching the data request from multiple data blocks as the demanded data block, and sends the demanded data block to the data sending device. Then the data sending device sends the demanded data block to the client. In this way, corresponding data blocks can be provided for different customers, thus improving the customers' use experience, and further improving the working efficiency of the system.

An embodiment of the disclosure relates to a data presentation method. The present embodiment is a further improvement based on the first embodiment. The specific improvements is as follows: in the present embodiment, a permission level of each data block is also stored in the database, and it is determined whether the client has permission to browse a data block before the data block is sent to the client, thereby improving the security of data presentation.

Figure 6:
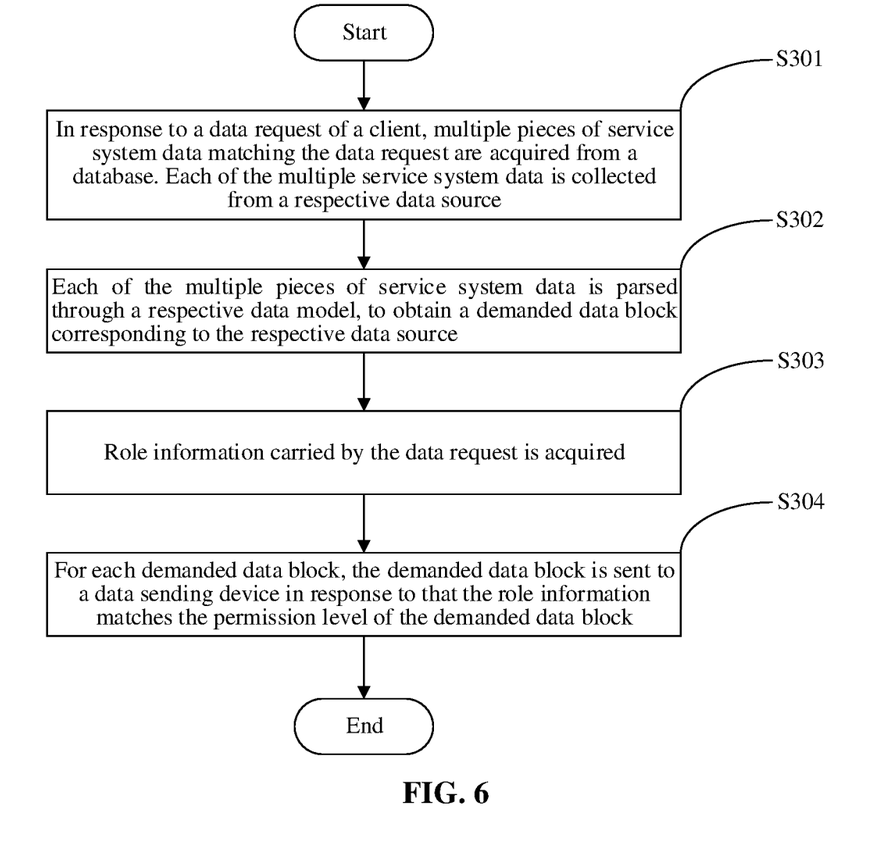
FIG. 6 illustrates a flowchart of another data presentation method provided in an embodiment of the disclosure.

As illustrated in FIG. 6, the specific procedure of the present embodiment includes the following operations.

At S301, in response to a data request of a client, multiple pieces of service system data matching the data request are acquired from a database. Each of the multiple service system data is collected from a respective data source.

Specifically, a permission level of each data block is also stored in the database in the present embodiment. That is, not everyone can see all the data blocks. For example, an ordinary staff can only see the data blocks of his/her department, while a manager can see the data blocks of multiple departments. In this way, the accuracy of data presentation is improved.

At S302, each of the multiple pieces of service system data is parsed through a respective data model, to obtain a demanded data block corresponding to the respective data source.

At S303, role information carried by the data request is acquired.

At S304, for each demanded data block, the demanded data block is sent to a data sending device in response to that the role information matches the permission level of the demanded data block.

Specifically, in the present embodiment, the permission levels of the demanded data blocks may be set to 1 to 10, and browsing permission levels may also be 1 to 10. The user with the browsing permission level 1 can only view the demanded data block with the permission level 1, while the user with the browsing permission level 10 can only view all the demanded data blocks. It is understandable that in the present embodiment, there is no specific limitation on the way of setting the browsing permission levels and the permission levels of the demanded data blocks, and different ways of setting the browsing permission levels and the permission levels of the demanded data blocks can be selected according to actual needs.

For example, the role information such as supervisor, senior executive, engineer, report manager, and so on can be set, and the permission levels of each data block can be set in advance in correspondence to the above role information. For example, the supervisor can view all the reports, while the engineer cannot view the data block including important indicators such as yield rate.

Compared with the related art, in the embodiments of the disclosure, by providing the data collection device, multiple pieces of service system data stored by various data sources can be collected, so that the service system data that the user need to view are no longer distributed and stored in different data sources, but uniformly stored in the database. Thus when needing to view data, instead of looking for the service system data to be viewed in each data source, the user only needs to look for the data in the database, which improves the working efficiency of the system. Moreover, each of the service system data can be converted into multiple data blocks by the data parsing device, so that each data block can run independently. That is, each data block can be dynamically split and operated, thereby improving the operating rate of the system and saving the system resources. After receiving the data request of the client, the request responding device selects the data block matching the data request from multiple data blocks as the demanded data block, and sends the demanded data block to the data sending device. Then the data sending device sends the demanded data block to the client. In this way, corresponding data blocks can be provided for different customers, thus improving the customers' use experience, and further improving the working efficiency of the system.

An embodiment of the disclosure relates to a data presentation method. The present embodiment is a further improvement based on the first embodiment. The specific improvements is as follows: in the present embodiment, the data request is split into multiple data sub-requests, and multiple demanded data blocks are assembled into one data report view to be sent to the client. In this way, the working efficiency of the system is improved, and the display interface of the client can simultaneously display the data in multiple demanded data blocks.

Figure 7:
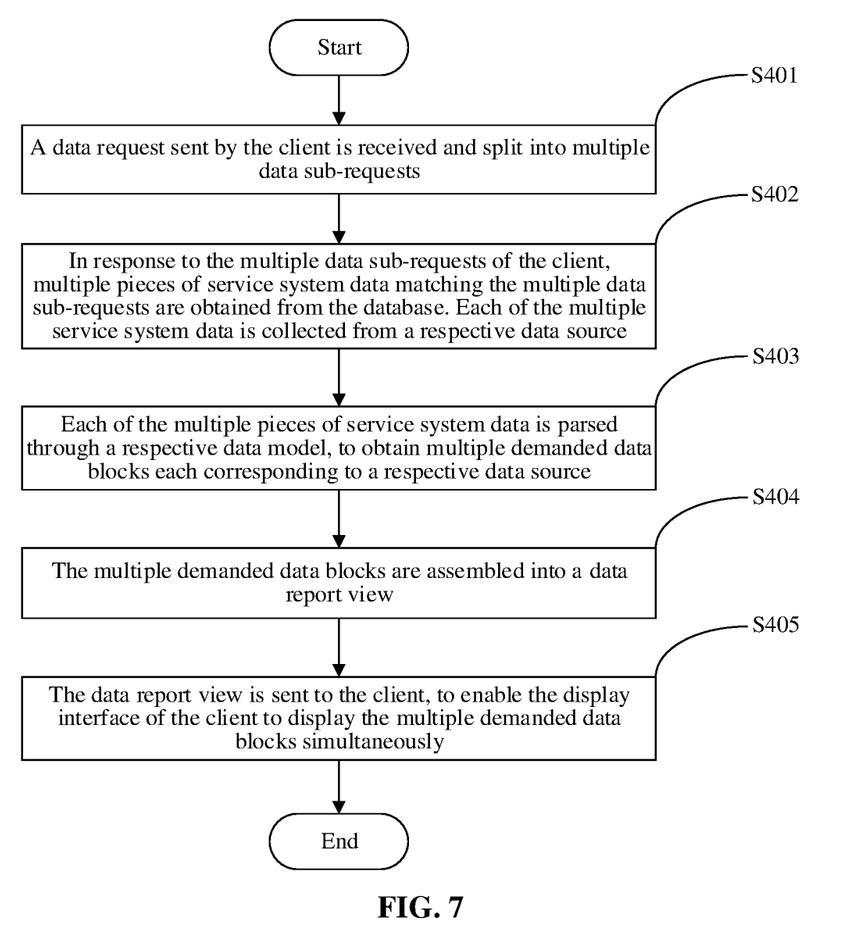
FIG. 7 illustrates a flowchart of yet another data presentation method provided in an embodiment of the disclosure.

As illustrated in FIG. 7, the specific procedure of the present embodiment includes the following operations.

At S401, a data request sent by the client is received and split into multiple data sub-requests.

Specifically, each data sub-request corresponds to a respective piece of service system data.

At S402, in response to the multiple data sub-requests of the client, multiple pieces of service system data matching the multiple data sub-requests are obtained from the database. Each of the multiple service system data is collected from a respective data source.

At S403, each of the multiple pieces of service system data is parsed through a respective data model, to obtain multiple demanded data blocks each corresponding to a respective data source.

At S404, the multiple demanded data blocks are assembled into a data report view.

At S405, the data report view is sent to the client, to enable the display interface of the client to display the multiple demanded data blocks simultaneously.

Compared with the related art, in the embodiments of the disclosure, by providing the data collection device, multiple pieces of service system data stored by various data sources can be collected, so that the service system data that the user need to view are no longer distributed and stored in different data sources, but uniformly stored in the database. Thus when needing to view data, instead of looking for the service system data to be viewed in each data source, the user only needs to look for the data in the database, which improves the working efficiency of the system. Moreover, each of the service system data can be converted into multiple data blocks by the data parsing device, so that each data block can run independently. That is, each data block can be dynamically split and operated, thereby improving the operating rate of the system and saving the system resources. After receiving the data request of the client, the request responding device selects the data block matching the data request from multiple data blocks as the demanded data block, and sends the demanded data block to the data sending device. Then the data sending device sends the demanded data block to the client. In this way, corresponding data blocks can be provided for different customers, thus improving the customers' use experience, and further improving the working efficiency of the system.

Figure 8:
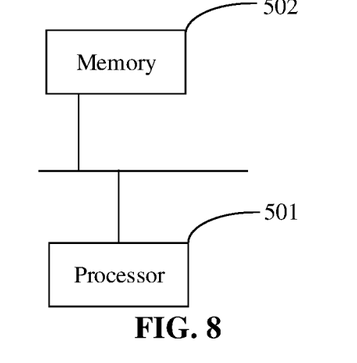
FIG. 8 illustrates a schematic structural diagram of a data presentation device provided in an embodiment of the disclosure.

An embodiment of the disclosure relates to a data presentation device. As illustrated in FIG. 8, the device includes: at least one processor 501, and a memory 502 in communication connection with the at least one processor 501. The memory 502 stores instructions executable by the at least one processor 501. The instructions, when executed by the at least one processor 501, cause the at least one processor 501 to perform the above data presentation method.

The memory 502 and the processor 501 are connected by a bus. The bus may include any number of interconnected buses and bridges. The bus connects circuits of one or more processors 501 and memories 502 together. The bus can also connect various other circuits together, such as peripheral devices, voltage regulators, and power management circuits, which are well known in the field and therefore are not described further here. A bus interface is provided as an interface between the bus and a transceiver. The transceiver may be a single element or multiple elements, for example, multiple receivers and transmitters, which provide a unit for communicating with a variety of other devices on a transmission medium. The data processed by the processor 501 is transmitted on a wireless medium via an antenna. Furthermore, the antenna also receives data and transmits the data to the processor 501.

The processor 501 takes charge of managing the bus and general processing, and can also provide a variety of functions, including timing, peripheral interface, voltage regulation, power management, and other control functions. The memory 502 can be used for storing the data used by the processor 501 in performing operations.

The sixth embodiment of the disclosure relates to a computer-readable storage medium having stored thereon a computer program that, when executed by the processor, implements the above method embodiment.

That is, those skilled in the art can understand that all or part of the steps in the above method embodiment can be accomplished by relevant hardware instructing a program, and the program is stored in a storage medium and includes a number of instructions to enable a device (which may be a single chip microcomputer, a chip, etc.) or a processor to perform all or part of the steps of the method in each embodiment of the disclosure. The storage media include, but not limited to, a USB flash disk, a mobile hard disk, a Read-Only Memory (ROM), a Random Access Memory (RAM), a magnetic disk or a compact disc, and other media capable of storing the program codes.

Those of ordinary skill in the art may understand that the above are particular embodiments for implementing the disclosure. In practical applications, various modifications may be made for the embodiments in form and detail without departing from the spirit and scope of the disclosure.

The invention claimed is:

1. A data presentation system, comprising: a data collection device, a data parsing device, a request responding device, and a data sending device, wherein:
the data collection device is configured to: collect multiple pieces of service system data each from a respective data source, and store the service system data in a database;
the data parsing device is configured to: obtain the multiple pieces of the service system data from the database, and parse each piece of the service system data through a respective data model to obtain a data block corresponding to the respective data source;

the request responding device is configured to: in response to a data request sent by a client, obtain, from the data parsing device, multiple data blocks matching the data request as demanded data blocks, and send the demanded data blocks to a data processing component of the data sending device; and the data processing component of the data sending device is configured to assemble the demanded data blocks into a data report view, and transmit the data report view to a data sending component of the data sending device, and the data sending component is configured to send the data report view to the client, to enable a display interface of the client to display the data report view.

2. The data presentation system of claim 1, wherein the request responding device is configured to:
receive the data request sent by the client;
split the data request into multiple data sub-requests; and
obtain, from the data parsing device, the demanded data blocks each matching a respective one of the multiple data sub-requests.

3. The data presentation system of claim 1, wherein each of the demanded data blocks comprises a data report and security state information, and each data model comprises a data part and a security state part;
the data parsing device is configured to parse each piece of the service system data through a data part of the respective data model to obtain data information, and fill a preset report template with the data information, to obtain a data report corresponding to the respective data source;
the data parsing device is further configured to compare each piece of the service system data with a respective data threshold through a security state part of the respective data model, to obtain security state information of the respective data source; and
the data sending device is configured to send the data report view to the client, to enable the display interface of the client to display data reports of the demanded data blocks and a-security states of the data reports of the demanded data blocks.

4. The data presentation system of claim 3, wherein the data parsing device is further configured to modify a display parameter of each of the demanded data blocks according to the security state information in the demanded data blocks; and
the data sending component is configured to send the data report view to the client, to enable the display interface of the client to display the demanded data blocks according to display parameters of the demanded data blocks respectively.

5. The data presentation system of claim 1, wherein each of the demanded data blocks comprises a permission level, and the request responding device is further configured to:
obtain role information carried by the data request,
obtain the permission level of each of the demanded data blocks, and
for each of the demanded data blocks, send the demanded data block to the data sending device in response to the role information matching the permission level of the demanded data block.

6. A data presentation method, comprising:
in response to a data request of a client, acquiring, from a database, multiple pieces of service system data matching the data request, wherein each of the multiple pieces of the service system data is collected from a respective data source;
parsing each of the multiple pieces of the service system data through a respective data model, so as to obtain demanded data blocks each corresponding to the respective data source;
assembling the demanded data blocks into a data report view; and
sending the data report view to the client, to enable a display interface of the client to display the data report view.

7. The data presentation method of claim 6, wherein before responding to the data request of the client, the method further comprises:
receiving the data request sent by the client; and
splitting the data request into multiple data sub-requests each corresponding to a respective piece of the service system data; and
acquiring, from the database, the multiple pieces of the service system data matching the data request comprises:
acquiring, from the database, the multiple pieces of the service system data respectively matching the multiple data sub-requests simultaneously.

8. The data presentation method of claim 6, wherein parsing each of the multiple pieces of service system data through the respective data model, to obtain the demanded data blocks each corresponding to the respective data source comprises:
for each of the multiple pieces of service system data, parsing the service system data to obtain data information, and filling a preset report template with the data information, to obtain a data report corresponding to the respective data source; and
comparing each of the multiple pieces of the service system data with a respective data threshold to obtain security state information of the respective data source; and
sending the data report view to the client, to enable the display interface of the client to display the data report view comprises:
sending the data report view to the client, to enable the display interface of the client to display data reports of the demanded data blocks and security states of the data reports of the demanded data blocks.

9. The data presentation method of claim 8, further comprising:
modifying a display parameter of each of the demanded data blocks according to the security state information in the demanded data blocks; and
sending the data report view to the client, to enable the display interface of the client to display the data reports of the demanded data blocks and the security states of the data reports of the demanded data blocks comprises:
sending the data report view to the client, to enable the display interface of the client to display the demanded data blocks according to display parameters of the demanded data blocks respectively.

10. The data presentation method of claim 6, wherein a permission level of each of the demanded data blocks is stored in the database; and sending the demanded data blocks to the client comprises:
acquiring role information carried by the data request,
acquiring the permission level of each of the demanded data blocks, and for each of the demanded data blocks, sending the demanded data block to a data sending device in response to the role information matching the permission level of the demanded data block.

11. A non-transitory computer-readable storage medium having stored thereon a computer program that, when executed by a processor, implements the data presentation method of claim 6.

12. The non-transitory computer-readable storage medium of claim 11, wherein before responding to the data request of the client, the method further comprises:
receiving the data request sent by the client; and
splitting the data request into multiple data sub-requests each corresponding to a respective piece of the service system data; and
acquiring, from the database, the multiple pieces of the service system data matching the data request comprises: acquiring, from the database, the multiple pieces of the service system data respectively matching the multiple data sub-requests simultaneously.

13. A data presentation device, comprising:
at least one processor, and
a memory in communication connection with the at least one processor,
wherein the memory stores instructions executable by the at least one processor, and the instructions, when executed by the at least one processor, enable the at least one processor to perform a data presentation method, comprising:
in response to a data request of a client, acquiring, from a database, multiple pieces of service system data matching the data request, wherein each of the multiple pieces of the service system data is collected from a respective data source;
parsing each of the multiple pieces of the service system data through a respective data model, so as to obtain demanded data blocks each corresponding to the respective data source;
assembling the demanded data blocks into a data report view; and
sending the data report view to the client, to enable a display interface of the client to display the data report view.

14. The data presentation device of claim 13, wherein before responding to the data request of the client, the method further comprises:
receiving the data request sent by the client; and
splitting the data request into multiple data sub-requests each corresponding to a respective piece of the service system data; and
acquiring, from the database, the multiple pieces of the service system data matching the data request comprises:
acquiring, from the database, the multiple pieces of the service system data respectively matching the multiple data sub-requests simultaneously.

15. The data presentation device of claim 13, wherein parsing each of the multiple pieces of service system data through the respective data model, to obtain the demanded data blocks each corresponding to the respective data source comprises:
for each of the multiple pieces of service system data, parsing the service system data to obtain data information, and filling a preset report template with the data information, to obtain a data report corresponding to the respective data source; and
comparing each of the multiple pieces of the service system data with a respective data threshold to obtain security state information of the respective data source; and
sending the data report view to the client, to enable the display interface of the client to display the data report view comprises:
sending the data report view to the client, to enable the display interface of the client to display data reports of the demanded data blocks and security states of the data reports of the demanded data blocks.

16. The data presentation device of claim 15, further comprising:
modifying a display parameter of each of the demanded data blocks according to the security state information in the demanded data blocks; and
sending the data report view to the client, to enable the display interface of the client to display the data reports of the demanded data blocks and the security states of the data reports of the demanded data blocks comprises:
sending the data report view to the client, to enable the display interface of the client to display the demanded data blocks according to display parameters of the demanded data blocks respectively.

17. The data presentation device of claim 13, wherein a permission level of each of the demanded data blocks is stored in the database; and sending the demanded data blocks to the client comprises:
acquiring role information carried by the data request,
acquiring the permission level of each of the demanded data blocks, and
for each of the demanded data blocks, sending the demanded data block to a data sending device in response to the role information matching the permission level of the demanded data block.

* * * * *